United States Patent [19]

Jackson, Jr. et al.

[11] 4,338,422

[45] Jul. 6, 1982

[54] PREPARATION OF POLYESTERS AND POLY(ESTER-CARBONATES) BY ACIDOLYSIS OF AROMATIC POLYCARBONATES

[75] Inventors: Winston J. Jackson, Jr., Kingsport, Tenn.; William R. Darnell, Weber City, Va.

[73] Assignee: Eastman Kodak Company, Rochester, N.Y.

[21] Appl. No.: 278,289

[22] Filed: Jun. 29, 1981

[51] Int. Cl.³ .................... C08L 69/00; C08G 18/42
[52] U.S. Cl. ..................................... 525/461; 528/80
[58] Field of Search ............................... 525/461

[56] References Cited

U.S. PATENT DOCUMENTS 4,238,597 12/1980 Markezich et al. ................. 525/461
4,260,695 4/1981 Medem et al. ..................... 525/461

OTHER PUBLICATIONS

Japanese Patent Application 15491/55:1980 (TOKKO).

*Primary Examiner*—H. S. Cockeram
*Attorney, Agent, or Firm*—William P. Heath, Jr.; Daniel B. Reece, III

[57] ABSTRACT

Process for the preparation of polyesters and poly(ester-carbonates) comprising heating, preferably with a suitable catalyst, aromatic diol polycarbonates and esters of cycloaliphatic or aromatic dicarboxylic acids. The polymers may contain 5–100 mole percent dicarboxylate moiety, based on total acids. The products have utility as molding plastics, fibers, films, adhesives, coatings, extruded shapes, etc. The hydroxy-terminated prepolymer obtained in the first step may be reacted with a diisocyanate to form a polyurethane.

9 Claims, No Drawings

PREPARATION OF POLYESTERS AND POLY(ESTER-CARBONATES) BY ACIDOLYSIS OF AROMATIC POLYCARBONATES

FIELD OF THE INVENTION

This invention is a process for the preparation of polyesters and poly(ester-carbonates). Polyesters and poly(ester-carbonates) may be prepared by heating, preferably in the presence of a suitable catalyst, the desired molar ratio (r) of an aromatic or cycloaliphatic dicarboxylic acid and an aromatic polycarbonate at >250° C. to form a hydroxyterminated prepolymer. This prepolymer can be further polymerized at >300° C. (preferably ~340° C.) to a high molecular weight polymer.

As stated earlier, polyesters and poly(ester-carbonates) may be prepared by this process. The factor which determines which of these types of polymers is obtained is the starting molar ratio (r) of dicarboxylic acid-/aromatic polycarbonate employed in the process. Generally a poly(ester-carbonate) containing decreasing amounts of carbonate is obtained as (r) increases toward 0.5. When (r) $\geq 0.5$, a polyester containing essentially no carbonate moiety is obtained.

The polymers prepared by this process have utility as molding plastics, fibers, films, adhesives, coatings, extruded shapes, etc. The hydroxy-terminated prepolymer obtained during the first step of the reaction also has utility when further reacted with, for example, a diisocyanate to form a polyurethane.

BACKGROUND ART

Japanese Patent Application No. 15491/55:1980 (TOKKO) discloses a process wherein a three-neck flask equipped with a stirring apparatus, a nitrogen gas introduction orifice, and a distilling-out orifice was charged with 25.4 parts of a polycarbonate ($\eta sp/C=0.98$) which was obtained by using bisphenyl A as the dihydroxy component, 13.0 parts of 2,6-naphthalenedicarboxylic acid (60 mole % relative to the bisphenol A component in the polycarbonate), and 0.005 parts of titanium tetrabutoxide. After the flask was purged with nitrogen, reaction was conducted at 300° C. under normal pressure for 30 minutes, then further under reduced pressure of about 20 mmHg for 1 hour, whereupon carbon dioxide gas evolved and the reaction mixture became transparent.

Next, 14.1 parts of diphenyl carbonate were added and reaction was conducted at 300° C. under normal pressure for 30 minutes; then the system was gradually depressurized and, 20 minutes later, reaction was conducted under reduced pressure of 0.5 mmHg for 1 hour. The $\eta sp/C$ of the polymer was 0.712, its melting point was 225~245° C., and its thermal deformation commencement temperature was 188° C.

The process described in Japanese Patent Application No. 15491/55:1980 (TOKKO) consists essentially of two steps: (1) heating the polycarbonate with 2,6-naphthalenedicarboxylic acid to evolve carbon dioxide and obtain a hydroxyl-terminated prepolymer; and (2) reaction of diphenyl carbonate with the hydroxyl-terminated prepolymer to liberate phenol and obtain a high molecular weight polyester or poly(ester-carbonate). It should be noted that this process always involves the second-step reaction with diphenyl carbonate.

It should be further noted that the Japanese Patent Application does not disclose the fact that the hydroxy-terminated prepolymer from the first step of their process may be heated under vacuum to eliminate bisphenol A and give a high molecular weight polymer without the addition of diphenyl carbonate. This is the difference between the Japanese process and our new process.

DISCLOSURE OF THE INVENTION

This invention is a process for the preparation of poly(ester-carbonates) comprising preparing a reaction mixture of an aromatic or cycloaliphatic dicarboxylic acid and an aromatic polycarbonate in a molar ratio (r) of dicarboxylic acid/polycarbonate of about 0.05 to about 0.50. The reaction mixture may contain a catalytic amount of a catalyst, preferably a titanium compound. In the process a preferred reactant is bisphenol A polycarbonate.

Polyesters and poly(ester-carbonates) may be prepared by heating, preferably in the presence of a suitable catalyst, the desired molar ratio (r) of an aromatic or cyclo-aliphatic dicarboxylic acid and an aromatic polycarbonate at >250° C. to form a hydroxy-terminated prepolymer. This prepolymer can be further polymerized at >300° C. (preferably ~340° C.) to a high molecular weight polymer.

Originally the intent concerning the reaction of a polycarbonate (BPA polycarbonate) with a dicarboxylic acid (terephthalic acid) was to react only one carboxyl group of the dicarboxylic acid with the polycarbonate to form poly(ester-carbonate) oligomers which would be terminated with carboxyl groups (from the terephthalic acid) and hydroxyl groups (from the bisphenol A). We then hoped to cause these terminal carboxyl and hydroxyl groups to react with each other in the presence of an appropriate catalyst by a direct esterification mechanism to form ester groups (by elimination of water) and a high molecular weight poly(ester-carbonate). We were surprised when an analysis of the condensation byproducts of the reaction indicated a substantial amount of monomeric bisphenol A. Apparently the dicarboxylic acid reacts with the polycarbonate to form ester groups and liberate carbon dioxide for as long as free carboxyl groups remain. The result is hydroxyl-(bisphenol A) terminated oligomers which, surprisingly, under high vacuum and in the presence of a catalyst eliminate bisphenol A monomer and increase the polymer molecular weight.

As earlier stated, polyesters and poly(ester-carbonates) may be prepared by the process of this invention. The factor which determines which of these types of polymers is obtained is the starting molar ratio (r) of dicarboxylic acid/aromatic polycarbonate employed in the process. Generally a poly(ester-carbonate) containing decreasing amounts of carbonate is obtained as (r) increases toward 0.5. When (r) $\geq 0.5$, a polyester containing essentially no carbonate moiety is obtained. The proposed mechanisms of reaction, using isophthalic acid with bisphenol A polycarbonate at "r" values of <0.5 and >0.5, are given in Equations 1 and 2, respectively.

Equation 1
Proposed Mechanism (Starting Molar Ratio of Dicarboxylic Acid/Polycarbonate: <0.5)
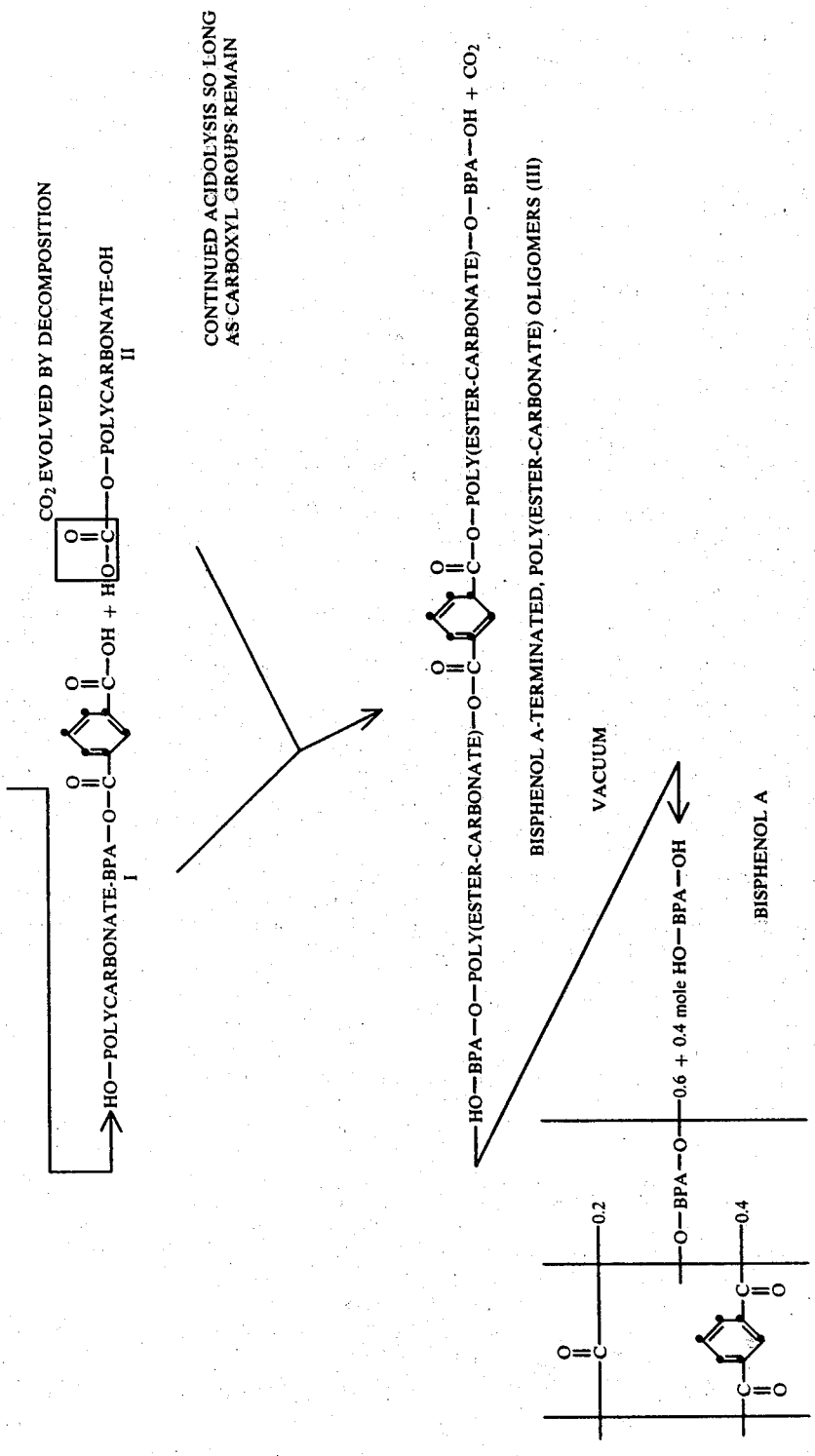
Equation 2
Proposed Mechanism (Starting Molar Ratio of Dicarboxylic Acid/Polycarbonate: >0.5)

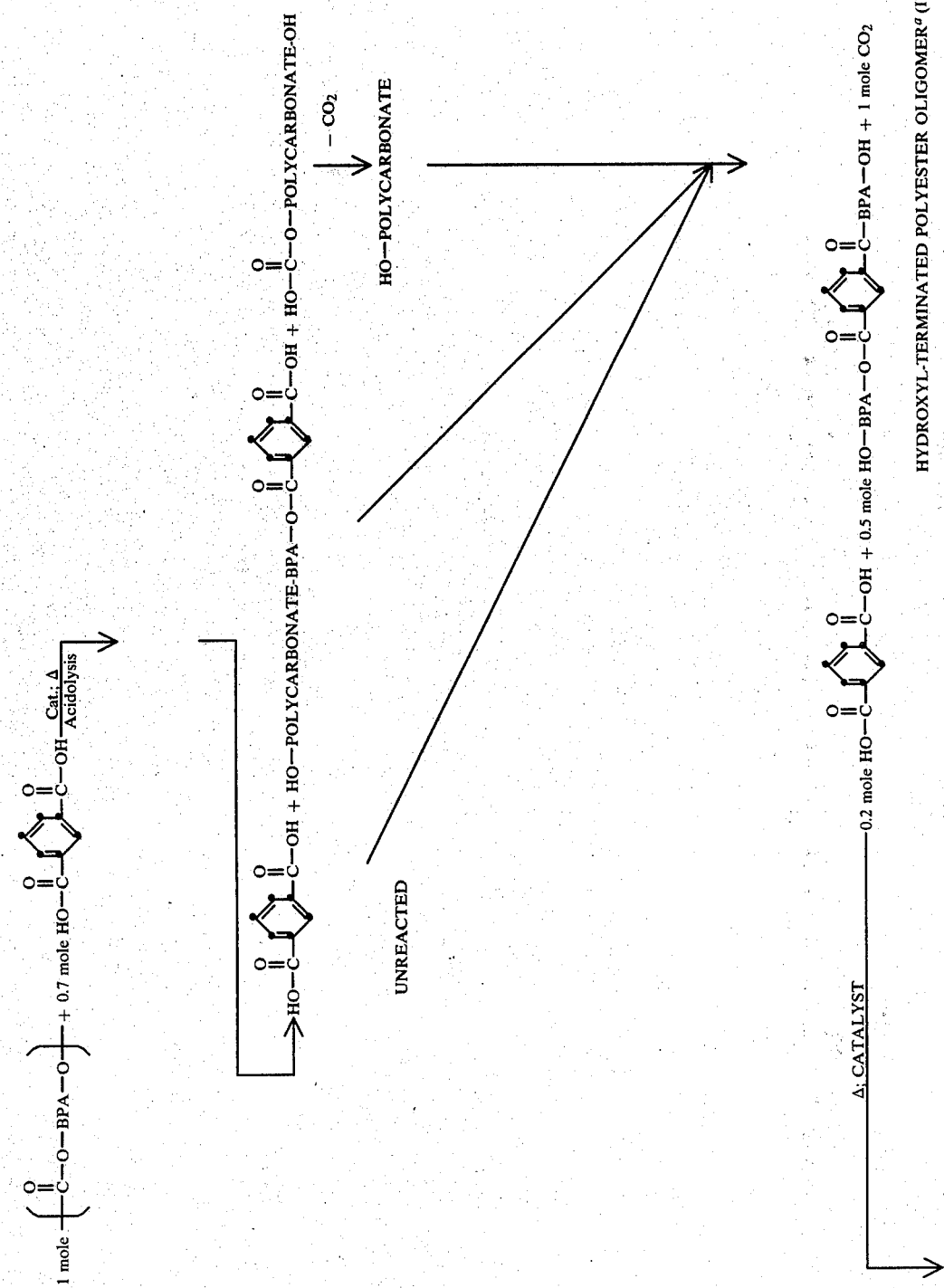

-continued
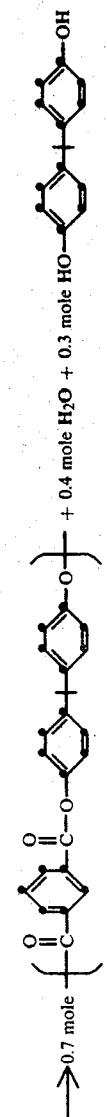
DIRECT ESTERIFICATION
BISPHENOL A
[a] Contains essentially no carbonate linkages In general at "r" <0.5, the isophthalic acid reacts with the bisphenol A polycarbonate by acidolysis to give at first polycarbonate oligomers terminated with (1) hydroxyl and carboxyl groups (I) and with (2) hydroxyl and bicarbonate groups (II) (Equation 1). All bicarbonate terminal groups rapidly lose $CO_2$ because of thermal instability to give oligomers having hydroxyl terminal groups on both ends. This process continues so long as any carboxyl groups remain, until only hydroxyl(bisphenol A)-terminated oligomers (III) remain. When the oligomers are heated under high vacuum, the terminal bisphenol A groups are removed and a high molecular weight polymer is attained.

When "r" $\geq 0.5$ (Equation 2), the mechanism is generally the same, except the result of the acidolysis reaction is hydroxyl-terminated polyester oligomers (IV) (containing no carbonate groups) and unreacted isophthalic acid. Upon further heating under high vacuum, bisphenol A is condensed from the system as before, but some direct esterification of the hydroxyl-terminated polyester oligomers with the unreacted isophthalic acid (to eliminate water) also occurs. The result is a polyester containing essentially no carbonate moiety. The polymers prepared by the process of the invention may contain 5 to 100 mole percent dicarboxylate moiety.

The aromatic polycarbonates which can be employed in the process of this invention may have inherent viscosities (I.V.'s) of ~0.2 up to 2–3 or more, but I.V.'s of about 0.5 to 0.6 are preferred.

The aromatic diols from which the aromatic polycarbonates are derived may be substituted with alkyl groups containing 1 to 4 carbon atoms and phenyl and may contain fused rings. The process is not limited to polycarbonates containing only one aromatic moiety. Examples of such aromatic diols are: 4,4'-(cyclohexylidene)diphenol, 4,4'-(isopropylidene)diphenol, 4,4'-dihydroxybiphenyl, methylhydroquinone, t-butylhydroquinone, 2,6-naphthalenediol, 1,5-naphthalenediol, 1,4-naphthalenediol, hydroquinone, resorcinol, phenylhydroquinone, 4,4'-dihydroxydiphenylmethane, 4,4'-dihydroxydiphenyl ether, and 4,4'-dihydroxydiphenyl sulfone. Polycarbonates containing one or more of these as well as other aromatic diol moieties may be used in the process of this invention so long as the starting polycarbonates and the polyesters and poly(ester-carbonates) prepared therefrom have sufficiently low melting points to be reactive in the process and sufficient thermal stability to withstand the conditions of polymer preparation. It is preferred that the aromatic diol polycarbonate be bisphenol A polycarbonate.

The dicarboxylic acids used in the process of this invention may be aromatic or cycloaliphatic. Examples of such acids are 1,4-cyclohexanedicarboxylic, terephthalic, isophthalic, and naphthalenedicarboxylic acids.

The process of the invention may be carried out with or without a catalyst. Higher temperatures are generally required to effect the reaction in the absence of a catalyst, and the polymer yields are generally higher when a catalyst is employed in the process. Catalysts which may be used in the process include compounds such as tetraisopropyl titanate, dibutyltin oxide, dibutyltin diacetate, lead oxide, zinc acetate, antimony acetate, and germanium oxide. Titanium catalysts, such as tetraisopropyl titanate, are preferred.

The catalyst concentration, based on the metal itself, may vary up to about 0.1 weight percent, depending upon the catalyst species and polymerization conditions used, but the preferred catalyst concentration is 50 to 400 ppm. (based on the metal) for the preferred catalyst, tetraisopropyl titanate.

The process may be carried out with and without a catalyst at 250° C. to 360° C. or more by a melt polymerization technique or, as in the case of high melting polymers, solid-phase polymerization of a melt-prepared prepolymer. Generally, higher temperatures are required to effect the reaction if a catalyst is not employed. The process is begun by heating the polycarbonate, the dicarboxylic acid, and, preferably, a catalyst at ~280° C. until the melt viscosity (imparted by the polycarbonate) has decreased very substantially. The reaction temperature is then increased as required to keep the polymerization mixture molten and to distill away the water and/or bisphenol A condensation by-products. Finally vacuum is applied and the pressure is decreased during ~10 to 45 minutes to 0.5 torr or less to attain a high molecular weight polymer. Generally this latter step of the polymerization is carried out at 320° C. to 360° C.

In some cases it may be preferred or essential to prepare the polymer by solid-phase polymerization techniques. This is accomplished by first preparing a prepolymer to a relatively low molecular weight in the melt. The prepolymer is then comminuted, crystallized, and further polymerized in the solid state. The solid-state polymerization is preferably carried out above about 265° C. and at least 10° C. below the melting point of the polymer.

Using the process as earlier described, one can prepare polymers having I.V.'s up to 1.0 or more, depending upon the purity of starting materials, the catalyst employed and the thermal stability of the polymers. The polymers prepared by the process of this invention have I.V.'s of at least 0.35 and, preferably, above 0.50.

The polymers prepared by the process of this invention have utility as molding plastics, fibers, films, adhesives, coatings, extruded shapes, etc. The hydroxy-terminated prepolymer obtained during the first step of the reaction also has utility when further reacted with, for example, a diisocyanate to form a polyurethane.

This invention will be further illustrated by the following examples although it will be understood that these examples are included merely for purposes of illustration and are not intended to limit the scope of the invention.

In the examples, the inherent viscosities of the polymers are determined at 25° C. in a 40/36/24 weight mixture of p-chlorophenol/phenol/1,1,2,2-tetrachloroethane at a concentration of 0.1 g./100 ml. The $^{13}C$ NMR spectra are obtained with a Brüker HX-90E carbon-13 NMR spectrophotometer, using a mixture of trifluoroacetic acid/d-chloroform as a solvent. Films are pressed in a Hannafin press at about 20° C. or more above the melting or flow point of the polymers. The melting points are determined with a Perkin-Elmer DSC-2 differential scanning calorimeter. The infrared spectra are obtained with a Perkin-Elmer Sodium Chloride Infrared Spectrophotometer, Model No. 137.

EXAMPLES

1. This example illustrates the utility of the process of the invention for the preparation of a poly(ester-carbonate) from a starting molar ratio of dicarboxylic acid/polycarbonate of <0.5.

A mixture of 25.4 g. (0.10 mole) of bisphenol A polycarbonate, I.V. 0.60; 6.64 g. (0.04 mole) isophthalic acid; and titanium tetraisopropoxide (225 ppm. Ti, based on theoretical polymer yield) are placed in a glass flask equipped with metal stirrer and provision for maintaining a nitrogen atmosphere in the flask. Provision is also made for applying vacuum to the flask. The flask is evacuated to 0.5 torr and purged with nitrogen three times. The contents of the flask are then vacuum dried at 0.5 torr for 30 minutes in a metal bath heated at 110° C., cooled, and bled to a nitrogen atmosphere. After the metal bath temperature is increased to 280° C., the flask is again immersed and heated with stirring. After about 20 minutes, an opaque melt is obtained. After about 75 minutes the melt viscosity has begun to decrease appreciably and a slow to moderate bubbling is evident in the melt mixture. After about 100 minutes a transparent-amber reaction mixture having a very low melt viscosity is obtained. At this time appreciable bubbling is still apparent in the polymer melt. After an additional 20 minutes the bubbling has essentially stopped, and the temperature of the metal bath is increased to 340° C. Thirteen minutes later vacuum is applied to the flask, and the pressure is reduced during 17 minutes to <0.5 torr. During the period of 15 to 30 minutes after the pressure becomes <0.5 torr, a substantial amount of material distilling from the flask is evident. After being heated for 110 minutes at 340° C. and <0.5 torr, the polymer has become very viscous and has wound up on the stirrer shaft. The product is light amber and has an I.V. of 0.73. A film pressed at 340° C. is amber and creasable. $^{13}$C NMR spectra indicate the product is a poly(ester-carbonate) of bisphenol A containing 67/33 molar ratio of isophthalate/carbonate.

2. This example illustrates the utility of the process of this invention for the preparation of a polyester containing essentially no carbonate from a starting molar ratio of dicarboxylic acid/polycarbonate of >0.5.

A mixture of 25.4 g. (0.10 mole) of bisphenol A polycarbonate, I.V. 0.60; 8.30 g. (0.05 mole) terephthalic acid; 3.32 g. (0.02 mole) isophthalic acid; and titanium tetraisopropoxide (205 ppm. Ti, based on theoretical polymer yield) are placed in a glass flask equipped as described in Example 1. After being purged three times with nitrogen, the flask contents are vacuum dried at 100° C. for 30 minutes at 0.5 torr. The flask is then heated with stirring under nitrogen as in Example 1 and vacuum is applied at 340° C. for 20 minutes. An amber polymer having a high melt viscosity is obtained. Its I.V. is 0.62, and its $T_g$ is 183° C. A film pressed at 340° C. is amber, clear and tough. An infrared spectrum indicates essentially no carbonate present in the polymer.

3. This example illustrates the utility of the process of the invention for preparing a polymer from a cycloaliphatic dicarboxylic acid using no catalyst.

A mixture of 25.4 g. (0.1 mole) of bisphenol A polycarbonate, I.V. 0.60, and 6.88 g. (0.04 mole) of trans-1,4-cyclohexanedicarboxylic acid are placed in a glass flask equipped as described in Example 1. The contents of the flask are then purged and dried as described in Example 2. The flask is then heated with stirring under nitrogen at 280° C. for 135 minutes, at which time a clear, low melt viscosity material is evident in the flask. The temperature of the metal bath is increased to 300° C. and the flask is heated for 23 minutes. Vacuum is applied to the flask during 9 minutes to obtain a pressure of <0.5 torr in the reaction flask. The metal bath temperature is then increased to 320° C. for 160 minutes and then to 340° C. for 215 minutes and cooled. The polymer is yellow and has an I.V. of 0.66. A film pressed at 340° C. is transparent, yellow and tough.

4. This example illustrates the utility of the process of the invention for preparing a polymer, starting with phenylhydroquinone polycarbonate and using no catalyst.

A mixture of 21.2 g. (0.10 mole) phenylhydroquinone polycarbonate, I.V. 0.37, and 8.3 g. (0.05 mole) of terephthalic acid are placed in a glass flask equipped as described in Example 1. After being purged with nitrogen and vaccum dried as described in Example 2, the contents of the flask are heated with stirring under nitrogen at 280° C. for 7 hours, and the metal bath temperature is increased to 340° C. Vacuum is applied and the pressure is reduced to <0.5 torr during 30 minutes. After an additional 14 minutes, an opaque, brown polymer with a high melt viscosity is obtained. The I.V. of the polymer is 1.89 and an infrared spectrum indicates little, if any, carbonate is present. A DSC curve indicates a Tg at 152° C. and endotherms at 321° C. and 332° C.

The invention has been described in detail with particular reference to preferred embodiments thereof, but it will be understood that variations and modifications can be effected within the spirit and scope of the invention.

We claim:

1. Process for the preparation of polyesters and poly(ester-carbonates) comprising preparing a reaction mixture of an aromatic or cycloaliphatic dicarboxylic acid and an aromatic polycarbonate in a molar ratio (r) of dicarboxylic acid/polycarbonate of about 0.05 to about 0.5, heating the mixture to at least 250° C. for a period of time sufficient to form a hydroxy-terminated prepolymer, and then reducing pressure and distilling out aromatic diol to yield polymer having an inherent viscosity of at least 0.35.

2. Process of claim 1 wherein the reaction mixture contains a catalytic amount of catalyst compounds such as tetraisopropyl titanate, dibutyltin oxide, dibutyltin diacetate, lead oxide, zinc acetate, antimony acetate, and germanium oxide.

3. Process of claim 2 wherein the catalyst is a titanium compound.

4. Process of claim 1 wherein said molar ratio (r) is less than 0.50.

5. Process of claim 1 wherein said molar ratio (r) is 0.50.

6. Process of claim 1 wherein said aromatic polycarbonate is bisphenol A polycarbonate.

7. Process of claim 1 wherein said polymer has an I.V. of ≧0.50.

8. Process of claim 1 wherein said polymer has an I.V. of ≧1.0.

9. Shaped article of the polymer produced by the process of claim 1.

* * * * *